United States Patent
Alfermann et al.

(10) Patent No.: US 9,203,285 B2
(45) Date of Patent: Dec. 1, 2015

(54) ELECTRIC MOTOR

(71) Applicant: GM GLOBAL TECHNOLOGY OPERATIONS LLC, Detroit, MI (US)

(72) Inventors: Timothy J. Alfermann, Carmel, IN (US); Brian Gallert, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 232 days.

(21) Appl. No.: 14/023,924

(22) Filed: Sep. 11, 2013

(65) Prior Publication Data
US 2015/0069865 A1  Mar. 12, 2015

(51) Int. Cl.
*H02K 9/19* (2006.01)
(52) U.S. Cl.
CPC ........................................ *H02K 9/19* (2013.01)
(58) Field of Classification Search
None
See application file for complete search history.

(56) References Cited

U.S. PATENT DOCUMENTS

2011/0084561 A1 *  4/2011  Swales et al. .................. 310/54

* cited by examiner

*Primary Examiner* — Tran Nguyen
(74) *Attorney, Agent, or Firm* — Quinn Law Group, PLLC

(57) ABSTRACT

An electric motor includes a rotor and a stator. The stator is fixed with respect to the drive-unit housing and includes windings, and the rotor is configured to rotate inside the stator about an axis. An air gap is defined between the rotor and the stator. The electric motor also includes an end-ring fixed to the rotor for rotation therewith. The electric motor is cooled by gravity feed via a fluid flowing onto and past the stator windings, from the windings to the rotor, and from the rotor back to the stator. The end-ring includes an annular channel configured to catch the fluid flowing from the windings to the rotor and divert the fluid away from the air gap as the fluid flows from the rotor back to the stator, thereby limiting spin losses in the electric motor. An electro-mechanical drive-unit employing the above-described electric motor is also disclosed.

17 Claims, 5 Drawing Sheets

ELECTRIC MOTOR

TECHNICAL FIELD

The disclosure relates to an electric motor for use in a powertrain of a motor vehicle.

BACKGROUND

To produce a more efficient vehicle, hybrid vehicle powertrains combine an electric motor(s) and a conventional internal combustion engine. Torque from the engine and the electric motor(s) is typically channeled to the vehicle's driven wheels via a transmission. Efficiency of a hybrid vehicle powertrain is typically related to the driving conditions and percentage of time that the engine must be run in addition to or in place of the electric motor to power the vehicle.

Some hybrid powertrains employ a single electric motor in combination with the engine. In such powertrains, transmission output, and hence vehicle speed, is directly related to the speeds and torques of the engine and the electric motor. Other hybrid powertrains employ two electric motors in combination with the engine to power the vehicle. Additionally, a vehicle may employ purely electric propulsion. In such a case, the vehicle's powertrain will have one or more motor-generators and no internal combustion engine.

In either a hybrid or purely electric powertrain the electric motor(s) are operatively connected to a transmission having planetary gearing such that torque and speed of the electric motor(s) may be selected independently of vehicle speed and desired acceleration. In a hybrid powertrain, control of the engine is typically achieved by varying individual torque contribution from the electric motor(s). Thus, such hybrid and purely electric powertrains may each provide selectable torque contribution from their electric motor(s), and in the case of the hybrid powertrain may similarly provide a selectable torque contribution from the engine to drive the subject vehicle.

SUMMARY

An electric motor includes a rotor and a stator. The stator is fixed with respect to the drive-unit housing and includes windings, and the rotor is configured to rotate inside the stator about an axis. An air gap is defined between the rotor and the stator. The electric motor also includes an end-ring fixed to the rotor for rotation therewith. The electric motor is cooled by gravity feed via a fluid flowing onto and past the stator windings, from the windings to the rotor, and from the rotor back to the stator. The end-ring includes an annular channel configured to catch the fluid flowing from the windings to the rotor and divert the fluid away from the air gap as the fluid flows from the rotor back to the stator, thereby limiting spin losses in the electric motor.

The end-ring includes an outer circumference, and the channel may extend continuously around the outer circumference.

The outer circumference may include a sharp edge positioned in a plane that is perpendicular to the axis. Such a sharp edge would be configured to generate detachment of the fluid from the end-ring.

In a cross-sectional view, the channel may include a slanted profile at the bottom surface of the channel that is configured to direct the fluid away from the air gap.

Also in the cross-sectional view, the end-ring includes a stepped portion and the channel is arranged at least partially in the stepped portion.

The stepped portion may include an increased material section configured for balancing of the rotor by removal of material from the section.

The end-ring may be constructed from a non-magnetic material, such as stainless steel or aluminum.

The end-ring may be attached to the rotor via at least one of a press-fit, staking, and welding.

An electro-mechanical drive-unit employing the above-described electric motor is also disclosed. The electro-mechanical drive-unit in conjunction with the power source, such as an internal combustion engine, may be part of a hybrid powertrain installed in and configured to launch and propel a vehicle.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
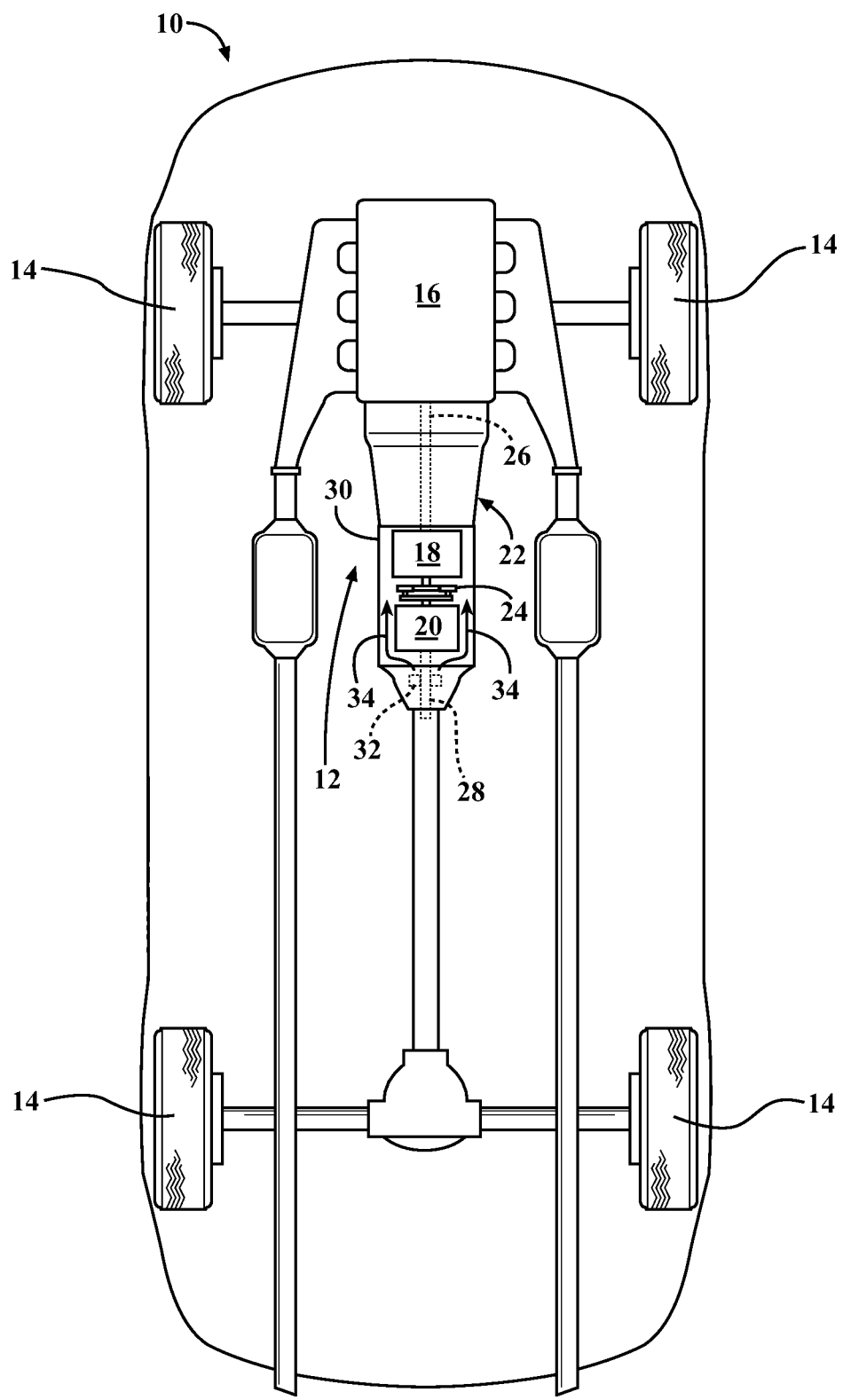
FIG. 1 is a schematic illustration of a hybrid electric vehicle employing an electrically variable transmission (EVT) having at least one motor/generator.

Referring to the drawings, wherein like reference numbers refer to like components, FIG. 1 illustrates a vehicle 10. The vehicle 10 includes a hybrid powertrain 12 configured to launch and propel the vehicle, i.e., to operate the vehicle in all speed ranges between low and high road speeds via drive wheels 14. As shown, the hybrid powertrain 12 includes multiple power sources, which may include an internal combustion engine 16, a first electric motor/generator 18, and a second electric motor/generator 20. The engine 16 is operatively connected to an electro-mechanical drive-unit that is depicted as an "electrically variable transmission" (EVT) 22. As additionally shown, first and second electric motor/generators 18, 20 are physically disposed inside the EVT 22.

As is known by those skilled in the art, an "electrically variable transmission" constitutes a gearing arrangement 24, which is typically configured as a transmission planetary gear train, operatively connected to each of the engine 16, the first motor/generator 18, and the second motor/generator 20. Channeling respective torques of the engine 16 and the two motor/generators 18 and 20 to different members of the planetary gear train permits one of the power sources to either assist or balance the operation of any of the other two. Thus, the combination of one engine 16 and two motor/generators 18 and 20 operatively connected to the EVT 22 allows speeds and torques of the engine and motor/generators to be controlled and selected independently in order to power the vehicle 10 more efficiently.

The vehicle 10 additionally includes an energy storage system having one or more batteries that are not specifically shown, but known by those skilled in the art. The energy storage system is operatively connected to the motor/generators 18 and 20 such that the motor/generators may transfer torque to or receive torque from the engine 16. Although not shown, the vehicle 10 also includes a controller or an electronic control unit (ECU). The controller is operatively connected to the power sources and to the energy storage system for controlling the distribution of torque from the power sources to the gearing arrangement 24.

Although the hybrid powertrain 12 as shown includes the engine 16, the EVT 22 may also be connectable solely to the first and second electric motor/generators 18, 20. In such a case, the powertrain 12 would no longer be a hybrid type, but would become purely electric, and the EVT 22 may then be broadly described as an electro-mechanical drive-unit. For simplicity and clarity, the remainder of the present description will refer to the electro-mechanical drive-unit EVT 22 as being connected to the engine 16, as well as to the motor/generators 18, 20. Additionally, the connections of the hybrid powertrain 12, to be described in greater detail below, may permit an overall decrease in torque requirement from the combination of the first and the second motor/generators 18 and 20 while affording acceptable vehicle performance, as compared with other systems.

Figure 2:
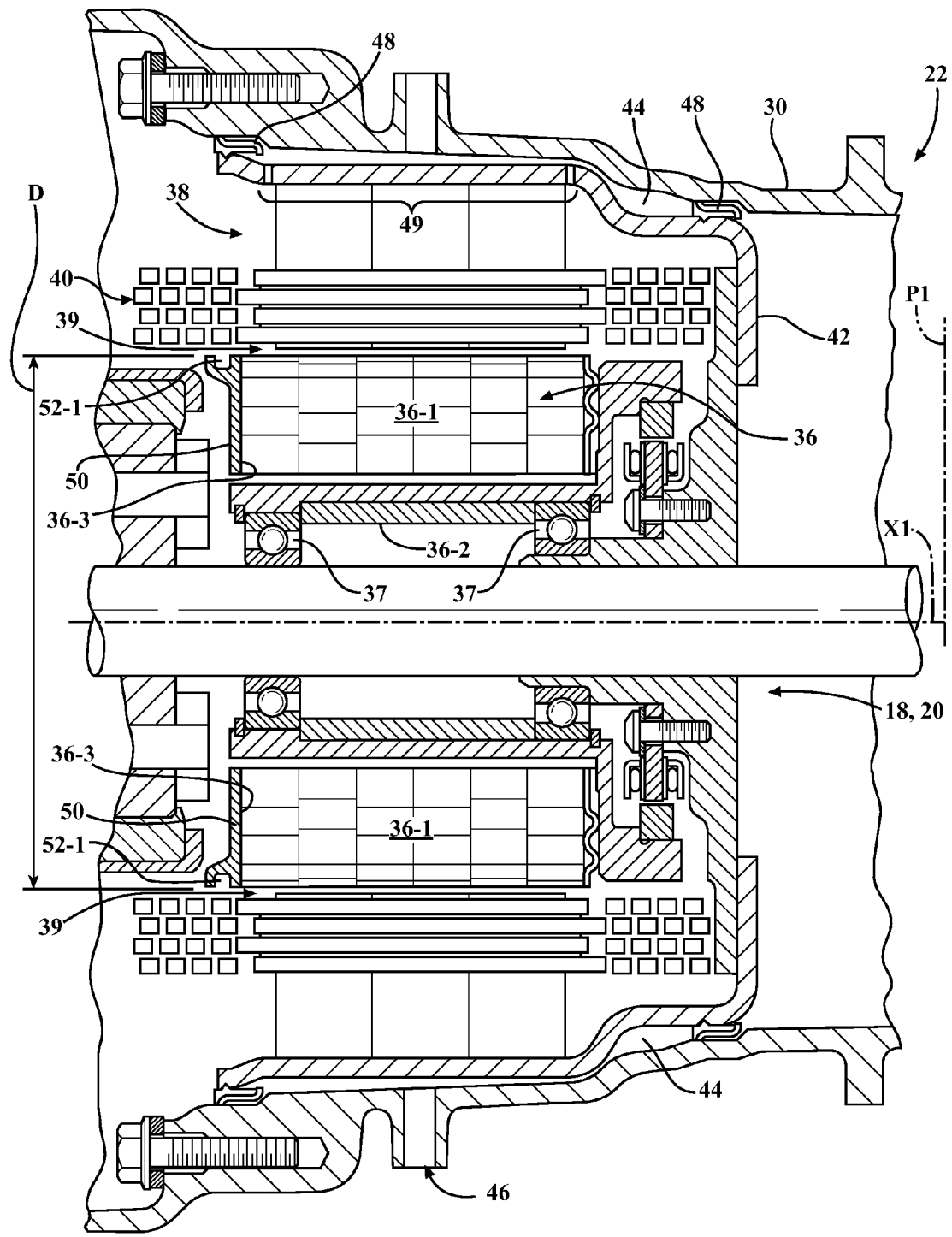
FIG. 2 is a schematic partial close-up cross-sectional side view of the EVT shown in FIG. 1, depicting one embodiment of an end-ring configured to divert cooling fluid from an air gap between the rotor and stator of the motor/generator.

As shown in FIG. 2, the EVT 22 includes an input member 26 which may be operatively connected to the engine 16 and an output member 28 which may be operatively connected to the drive wheels 14. The EVT 22 also includes a drive-unit housing 30 that retains internal components of the EVT and also functions as a stationary member to which certain torque transmitting devices (not shown) may be grounded on demand to affect shifts between distinct gear ratios. The gearing arrangement 24 is operatively connected to each of the output and input members 26, 28. The EVT 22 also includes a pump 32, which may be electrically driven by the energy storage system noted above. The pump 32 is configured to circulate a fluid 34, such as specially formulated transmission oil, inside the EVT 22.

As shown in FIG. 2, each of the first and second electric motor/generators 18, 20 includes a rotor 36 with laminations 36-1. The rotor 36 is supported by bearings 37 and operatively connected to the gearing arrangement 24. Each of the first and second electric motor/generators 18, 20 also includes a stator 38 that surrounds the rotor 36. The stator 38 includes windings 40 and is fixed with respect to the drive-unit housing 30. Accordingly, the rotor 36 is configured to rotate inside the stator 38 with respect to an axis X1 in each of the subject electric motor/generators 18, 20 during pertinent operation of the hybrid powertrain 12. A clearance or air gap 39 is defined, i.e., present, between the rotor 36 and the stator 38 for no-contact rotation between the rotor and the stator.

As shown in FIG. 2, each of the first and second electric motor/generators 18, 20 may also include a motor housing 42 configured to retain the rotor 36 and the stator 38 inside the EVT 22. The fluid 34 is supplied toward the motor/generators 18, 20 such that the stator 38 of the subject motor/generator is cooled via the fluid coming into contact with the stator by gravity feed or via fluid pressure. Following its initial contact with the stator 38, the fluid typically flows onto and past the stator windings 40, from the windings to the rotor 36, and from the rotor back to the stator. A fluid cavity 44 may be formed between the drive-unit housing 30 and the motor housing 42. During operation of the EVT 22, the fluid cavity 44 may receive the fluid 34 directly from the pump 32 or via a supply feed 46 disposed in the drive-unit housing 30 and in fluid communication with the pump. The fluid cavity 44 may be sealed via a plurality of seals 48 disposed between the drive-unit housing 30 and the motor housing 42 (as shown), or remain open to other internal components of the EVT 22. In the case of sealed fluid cavity 44, the fluid 34 may then be supplied from the cavity by gravity feed via feed channels 49. Alternatively, the fluid 34 may be provided to an interior or central portion 36-2 of the rotor 36 and then come into contact with the stator windings 40.

Figure 3:
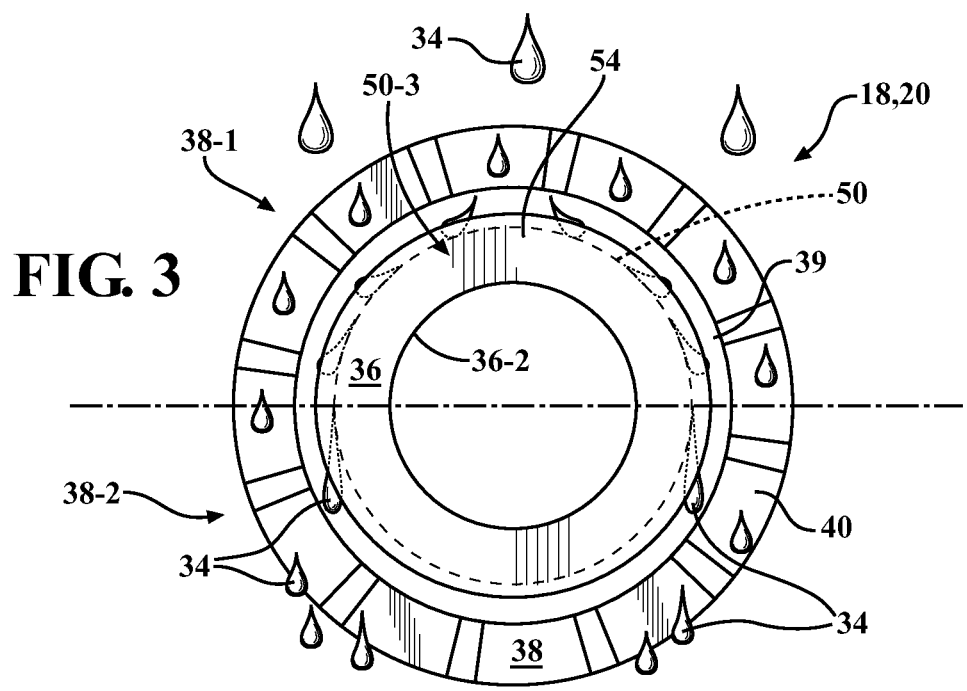
FIG. 3 is a schematic partial front view of the motor/generator shown in FIG. 2.

As shown in FIG. 3, the stator 38 has an upper half 38-1 spanning approximately 180 degrees and a generally diametrically opposite lower half 38-2 spanning the remaining approximately 180 degrees of the stator cross-section. The fluid 34 is fed into the vicinity of each motor/generator 18, 20 such that the stator 38 is cooled by the fluid flowing or dripping onto and past the upper half 38-1. The fluid 34 may flow through the windings 40 and into the central portion 36-2 of the rotor 36 and the bearings 37, or flow from the central portion 36-2 to the windings 40. After cooling and lubricating the central portion 36-2 and the bearings 37, the fluid 34 will typically flow to the lower half 38-2 of the stator 38 and then drain into other portions of the EVT 22. Furthermore, the fluid 34 may collect between the rotor 36 and the stator 38 in the air gap 39. The fluid 34 collecting in the air gap 39 may generate hydraulic drag between the rotor 36 and stator 38, thereby increasing spin losses and decreasing operating efficiency of the subject motor/generator.

With resumed reference to FIG. 2, an annular end-ring 50 is fixed to the rotor 36 for rotation therewith. The end-ring 50 may be attached to the rotor 36 via at least one of a press-fit, staking, and welding. As additionally shown, the end-ring 50 is disposed at a distal end 36-3 of the rotor 36 and provides axial retention of the laminations 36-1 that form a part of the magnetic flux path in the motor/generator 18, 20. The end-ring 50 is constructed from a non-magnetic material, such as a stainless steel or aluminum, in order to not interfere with a magnetic field produced by the subject motor/generator 18, 20. Each motor/generator 18, 20 may employ one end-ring 50 at one end and another end-ring 50 at the other end of the motor/generator.

The end-ring 50 includes an annular channel 52 configured to catch the fluid 34 flowing from the windings 40 to the rotor 36 and divert or guide the fluid away from the air gap 39 and back onto the windings as the fluid flows by gravity feed from the rotor back to the stator 38. Accordingly, by diverting the fluid away from the air gap 39, the channel 52 limits spin losses in the electric motor/generators 18, 20. The fluid 34 being diverted from the air gap 39 is of particular importance at zero rotational speed of the rotor 36 in order to prevent air gap flooding when there is no rotor motion to pump the fluid out of the air gap. Otherwise, if the fluid 34 does collect in the air gap when the rotor 36 is stationary, the subject motor/generator 18, 20 will experience significant loss in efficiency at the start of rotor 36 rotation.

As shown, the end-ring 50 includes an outer circumference defined by a diameter D and the channel 52 extends continuously around the outer circumference. On the outer circumference, the end-ring 50 includes a sharp edge 50-2 configured to generate detachment of the fluid 34 from the end-ring 50, particularly flowing from a face 50-1 of the end ring. The sharp edge 50-2 is defined by a plane P1 that is substantially perpendicular, i.e., within an applicable manufacturing tolerance, to the axis X1 and is the feature of the channel that is closest to the face 50-1. Accordingly, the sharp edge 50-2 is shaped to facilitate drainage of the fluid 34 at a distance away from the air gap 39. The sharp edge 50-2 may be generated by a formed or machined corner of the end-ring 50 that is substantially equal to or smaller than 85 degrees relative to the plane P1. In the present case, the term "substantially equal to or smaller than 85 degrees" means that the sharp edge 50-2 may be defined by an angle that is smaller than 90, i.e., an acute angle.

As may be seen in FIG. 2 depicting the cross-sectional view of the EVT 22, the channel 52 may include a profile defined by a flat bottom surface 52-1 that is substantially parallel relative to the axis X1. Alternatively, as may be seen in and close-up illustrations of the rotor in FIGS. 4 and 5, the channel 52 may include a profile defined by a slanted bottom surface 52-2 that is configured to direct the fluid 34 away from the air gap 39. The slanted bottom surface 52-2 is positioned at an angle θ relative to the axis X1. The angle θ may be either in the positive or negative direction relative to the axis X1 when viewed relative to the upper half 38-1 of the stator 38. Accordingly, as viewed from the perspective of the upper half 38-1, the angle θ is termed as positive when the channel 52 ramps up away from the face 50-1 and toward the rotor 36, and termed as negative when the channel 52 slopes down away from the face 50-1 and toward the rotor 36. The magnitude of the angle θ may, for example, be between 5 and 45 degrees either in the positive or negative direction relative to the axis X1.

Figure 4:
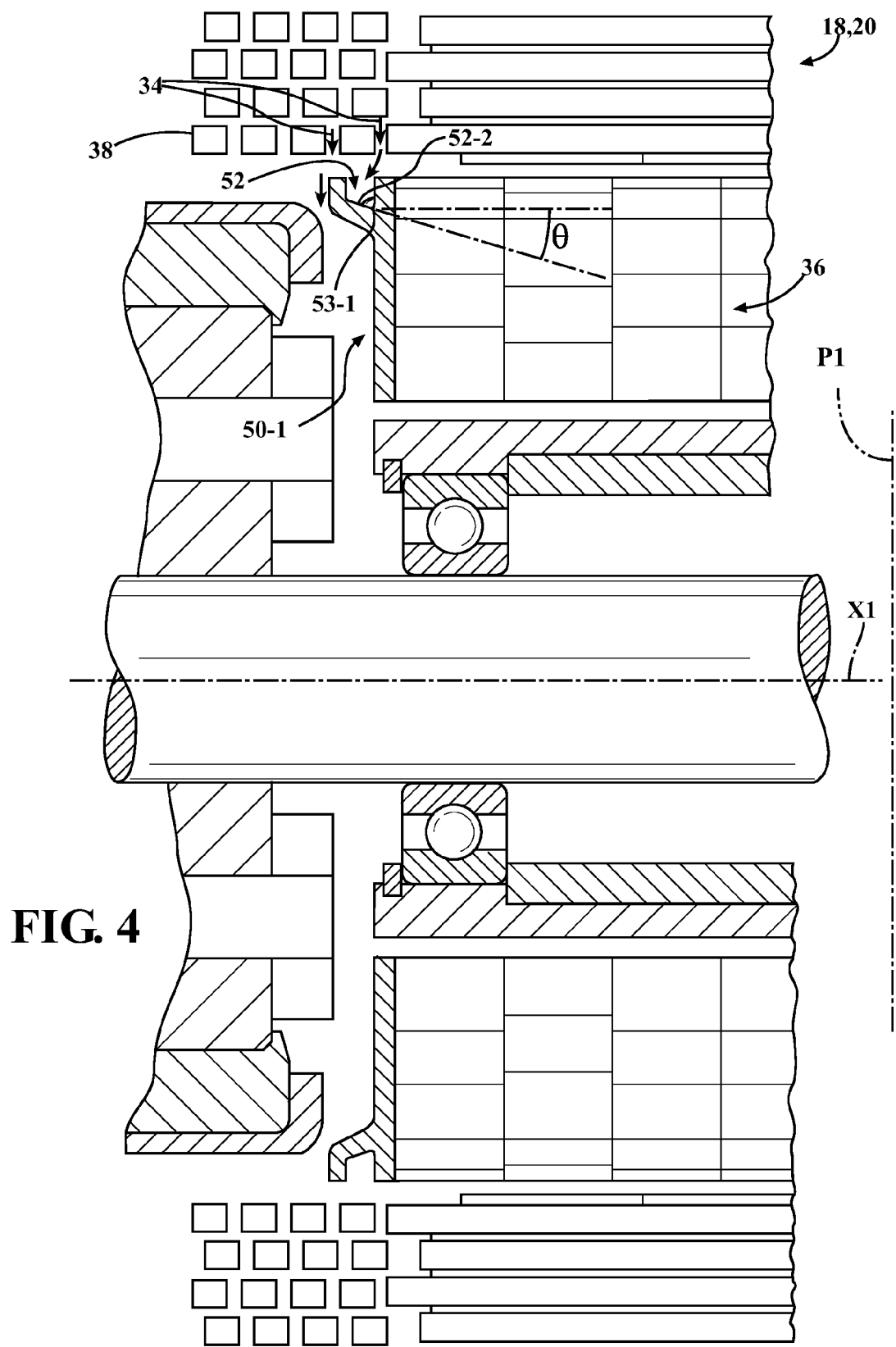
FIG. 4 is a schematic close-up cross-sectional partial side view of the motor/generator shown in FIG. 1, depicting another embodiment of the end-ring.
Figure 5:
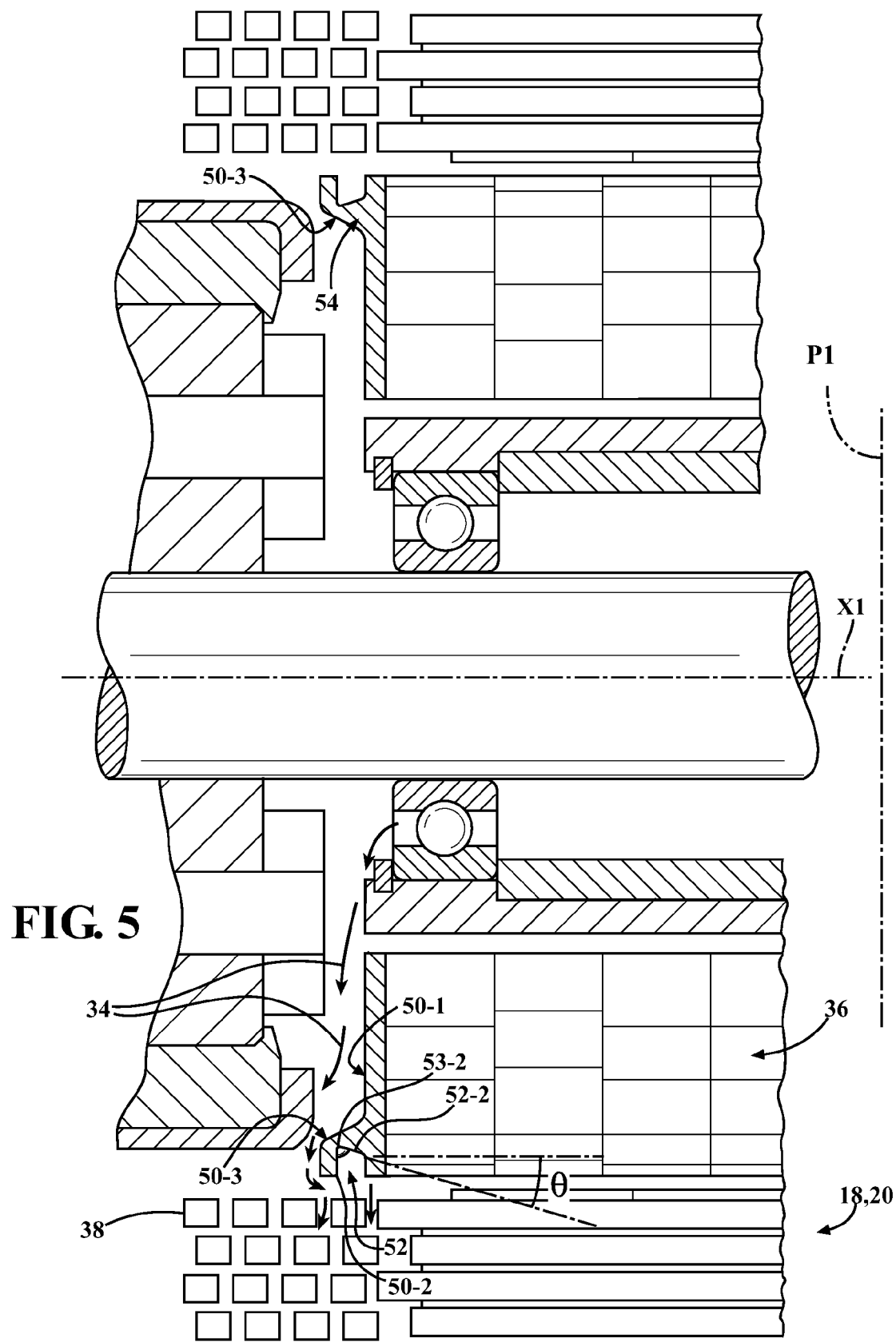
FIG. 5 is a schematic close-up cross-sectional partial side view of the motor/generator shown in FIG. 1, depicting yet another embodiment of the end-ring.

As may be seen in FIGS. 4 and 5, the angle θ of the slanted bottom surface 52-2 will permit gravity to pull the fluid 34 such that the fluid will collect in a lowest position 53-1 (shown in FIG. 4) or 53-2 (shown in FIG. 5), depending on whether the angle θ is positive or negative. However, as the fluid 34 flows down to the lower half 38-2 of the stator, some fluid may attach to the slanted bottom surface 52-2 and flow back toward the air gap 39. Accordingly, flow rates of the fluid 34 that falls in proximity to the air gap 39 in the upper half 38-1 versus the lower half 38-2 of the stator 38 and viscosity of the fluid are some of the variables that will influence determination of the specific angle θ such that the largest volume of fluid may be deposited away from the air gap 39.

For example, if the viscosity of the fluid 34 is high and the projected flow rate is low, the fluid in the channel 52 will tend to attach to the slanted bottom surface 52-2 and stay in the channel 52 at the lower half 38-2. In such a case, the positive angle θ will be used for the slanted bottom surface 52-2 in order to guide the fluid away from the air gap 39 in the lower half 38-2. As may be seen in FIG. 4, because the slanted bottom surface 52-2 is arranged at the positive angle θ relative to the axis X1, the bottom surface captures the fluid proximate to the upper half 38-1 and ejects the fluid 34 out of the channel 52 at a position 53-1 that is the farthest location on the channel relative to the air gap 39.

On the other hand, if the viscosity of the fluid 34 is low and the projected flow rate is high, the fluid will tend to detach from the channel 52 in the vicinity of axis X1 and fall off the end-ring 50 by gravity onto lower half 38-2 of the stator 38. Accordingly, in such a case, negative angle θ will be used for the slanted bottom surface 52-2 in order to guide the fluid away from the air gap 39 proximate to the upper half 38-1. As may be seen in FIG. 5, because the slanted bottom surface 52-2 is arranged at the negative angle θ relative to the axis X1, the deepest part of the channel 52 is located at a position 53-2 that is the farthest possible position on the channel relative to the air gap 39. Accordingly, when the appropriate positive or negative angle θ is used for the specific motor/generator 18, 20, the fluid will tend to come off the end ring at the sharp edge 50-2 to thereby further facilitate drainage of the fluid 34 at a distance away from the air gap 39.

As may additionally be seen in the cross-sectional view of FIGS. 2 and 4-5, the end-ring 50 may also include a stepped portion 50-3. The channel 52 is arranged at least partially in the stepped portion 50-3. The stepped portion 50-3 is configured, i.e., shaped, to guide away from the air gap 39 the fluid 34 that drains from inside the rotor 36. The shape of the stepped portion 50-3 is intended to facilitate ejection of the fluid from the end ring 50 without flowing along the entire face 50-1, wherein increased velocity of the fluid 34 would assist in separating the fluid from the face. Additionally, as shown in FIGS. 3 and 5, the stepped portion 50-3 includes an increased material section 54 that is configured for balancing of the rotor 36 by removal of material from the section. Accordingly, the section 54 is configured with sufficient increased amount of material relative to the remainder of the stepped portion 50-3, such that following material removal for balancing of the rotor 36 there will remain at least some minimum material thickness, such as at least 0.5 mm between the machined area and the channel 52. Such balancing of the end-ring 50 may be accomplished either by drilling, grinding, or other machining of the stepped portion 50-3.

The velocity and flow rate of the fluid 34 inside the subject motor/generator 18, 20 will influence how and where the fluid will collect on the end-ring 50. Additionally, whether the fluid 34 is introduced at the upper half 38-1 of the stator 38 via the fluid cavity 44 or at the lower half 38-2 via the central portion 36-2 of the rotor 36 will also impact how the fluid will flow relative to the end-ring features, i.e., the channel 52 and the stepped portion 50-3. If the fluid 34 is introduced at the upper half 38-1 of the stator 38 via the fluid cavity 44 the fluid will generally flow down the channel 50. On the other hand, if the fluid is introduced at the lower half 38-2 via the central portion 36-2 the fluid will flow down the face 50-1 and the stepped portion 50-3.

The cooling and lubrication facilitated by the end-ring 50 is beneficial to the electric motor/generators 18, 20 in facilitating removal of thermal stress frequently seen by the windings 40 when electric current is repeatedly passed therethrough, while reducing spin losses during operation of the EVT 22. Accordingly, continuous cooling via fluid 34 being discharged onto the windings 40 would serve to reduce temperature of the stator 38 and increase operating window, longevity, and reliability of the particular electric motor/generator 18 or 20. Furthermore, gravity could be used to deposit the fluid 34 onto the windings 40, while the end-ring 50 may be advantageously employed for effective diverting of the fluid from the air gap 39 to limit spin losses in the subject motor/generator 18, 20.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An electro-mechanical drive-unit connectable with at least one power source for launching and propelling a vehicle, comprising:

an input member and an output member;
a drive-unit housing;
a gearing arrangement operatively connected to each of the output and input members;
a pump configured to circulate fluid inside the drive-unit housing; and
an electric motor including:
a stator fixed with respect to the drive-unit housing and having windings;
a rotor operatively connected to the gearing arrangement and configured to rotate within the stator about an axis, wherein an air gap is defined between the rotor and the stator; and
an end-ring fixed to the rotor for rotation therewith;
wherein:
the electric motor is cooled by gravity feed via the fluid flowing onto and past the windings of the stator, from the windings to the rotor and an interior portion of the rotor, and draining from the rotor back to the stator;
the end-ring includes an annular channel configured to catch the fluid flowing from the windings to the rotor and divert the fluid away from the air gap as the fluid flows from the rotor back to the stator, thereby limiting spin losses in the electric motor;
in a cross-sectional view the end-ring includes a stepped portion and the channel is arranged at least partially in the stepped portion; and
the stepped portion is configured to guide away from the air gap the fluid that drains from the interior portion of the rotor.

2. The electro-mechanical drive-unit according to claim 1, wherein the end-ring includes an outer circumference, and wherein the channel extends continuously around the outer circumference.

3. The electro-mechanical drive-unit according to claim 2, wherein the outer circumference includes a sharp edge positioned in a plane that is perpendicular to the axis, and wherein the sharp edge is configured to generate detachment of the fluid from the end-ring.

4. The electro-mechanical drive-unit according to claim 1, wherein in the cross-sectional view the channel includes a slanted profile configured to direct the fluid away from the air gap.

5. The electro-mechanical drive-unit according to claim 1, wherein the stepped portion includes a section having increased amount of material relative to remainder of the stepped portion, and wherein the section is configured for balancing of the rotor by removal of at least some of the increased amount of material from the section.

6. The electro-mechanical drive-unit according to claim 1, wherein the end-ring is constructed from a non-magnetic material.

7. The electro-mechanical drive-unit according to claim 1, wherein the end-ring is attached to the rotor via at least one of a press-fit, staking, and welding.

8. An electric motor comprising:
a stator having windings;
a rotor configured to rotate within the stator about an axis, wherein an air gap is defined between the rotor and the stator; and
an end-ring fixed to the rotor for rotation therewith;
wherein:
the electric motor is cooled by gravity feed via a fluid flowing onto and past the windings of the stator, from the windings to the rotor and an interior portion of the rotor, and draining from the rotor back to the stator; and
the end-ring includes an annular channel configured to catch the fluid flowing from the windings to the rotor and divert the fluid away from the air gap as the fluid flows from the rotor back to the stator, thereby limiting spin losses in the electric motor;
in a cross-sectional view the end-ring includes a stepped portion and the channel is arranged at least partially in the stepped portion; and
the stepped portion is configured to guide away from the air gap the fluid that drains from the interior portion of the rotor.

9. The electric motor according to claim 8, wherein the end-ring includes an outer circumference, and wherein the channel extends continuously around the outer circumference.

10. The electric motor according to claim 9, wherein the outer circumference includes a sharp edge positioned in a plane that is perpendicular to the axis, and wherein the sharp edge is configured to generate detachment of the fluid from the end-ring.

11. The electric motor according to claim 8, wherein in the cross-sectional view the channel includes a slanted profile configured to direct the fluid away from the air gap.

12. The electric motor according to claim 8, wherein the stepped portion includes a section having increased amount of material relative to remainder of the stepped portion, and wherein the section is configured for balancing of the rotor by removal of at least some of the increased amount of material from the section.

13. The electric motor according to claim 8, wherein the end-ring is constructed from a non-magnetic material.

14. The electric motor according to claim 13, wherein the end-ring is attached to the rotor via at least one of a press-fit, staking, and welding.

15. An electric motor comprising:
a stator having windings;
a rotor configured to rotate within the stator about an axis, wherein an air gap is defined between the rotor and the stator; and
an end-ring fixed to the rotor for rotation therewith;
wherein:
the electric motor is cooled by gravity feed via a fluid flowing onto and past the windings of the stator, from the windings to the rotor and an interior portion of the rotor, and draining from the rotor back to the stator;
the end-ring includes an annular channel configured to catch the fluid flowing from the windings to the rotor and divert the fluid away from the air gap as the fluid flows from the rotor back to the stator, thereby limiting spin losses in the electric motor;
the end-ring includes an outer circumference, and wherein the channel extends continuously around the outer circumference;
in a cross-sectional view the end-ring includes a stepped portion and the channel is arranged at least partially in the stepped portion; and
the stepped portion is configured to guide away from the air gap the fluid that drains from the interior portion of the rotor and includes a section having increased amount of material relative to remainder of the stepped portion, such that the section is configured for balancing of the rotor by removal of at least some of the increased amount of material from the section.

16. The electric motor according to claim 15, wherein in the cross-sectional view the channel includes a slanted profile configured to direct the fluid away from the air gap.

17. The electric motor according to claim 15, wherein the outer circumference includes a sharp edge positioned in a plane that is perpendicular to the axis, and wherein the sharp edge is configured to generate detachment of the fluid from the end-ring.

* * * * *